Nov. 20, 1934. A. B. BUTTERWORTH Re. 19,374
METHOD OF CLEANING, SCALING, AND GAS FREEING
BULK CARGO TANKS OF TANK VESSELS
Original Filed Oct. 11, 1927
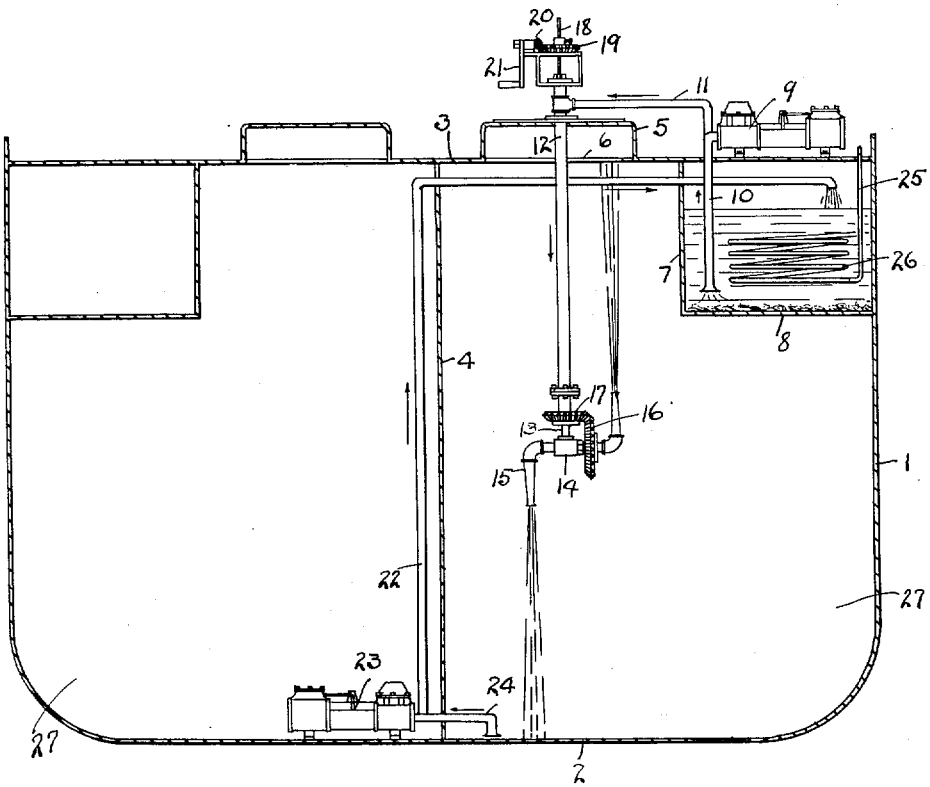
A. B Butterworth Inventor
By Jesse R. Stone
Attorney Reissued Nov. 20, 1934 Re. 19,374

UNITED STATES PATENT OFFICE 19,374

METHOD OF CLEANING, SCALING, AND GAS FREEING BULK CARGO TANKS OF TANK VESSELS

Arthur B. Butterworth, Brooklyn, N. Y., assignor, by mesne assignments, to Butterworth System, Inc., Wilmington, Del., a corporation of Delaware Original No. 1,806,740, dated May 26, 1931, Serial No. 225,592, October 11, 1927. Application for reissue August 1, 1933, Serial No. 683,231

9 Claims. (Cl. 141—1)

My invention relates to a method of cleaning the interior of tanks of tank vessels employed in transporting crude oil and its derivatives.

The tanks of vessels employed in transporting petroleum and its distillates may be employed in the carrying of the heavy crude or any of the distillates obtained therefrom, and it sometimes becomes necessary after a tanker has been employed in the transportation of heavy crude to carry in this same vessel a cargo of the lighter distillates, such as gasoline or benzine. In changing from transportation of the heavy oil to that of the lighter distillates, it becomes necessary to thoroughly clean the interior of the cargo tanks so that the distillate will not be discolored during transportation, due to the residue left in the tank from the crude oil.

The present system of cleaning the tanks of a vessel of this character involves a long and laborious process which is also expensive in its operation and which may also result in a deterioration of the hull of the vessel. In the other method, the first operation is usually to steam out the tanks by forcing into the tanks a supply of steam which is intended to make the residue oil within the tank more fluid and to remove from the rust and scale on the interior of the tank, gas-forming residue which accumulates along the sides and among the numerous plates and the frame-work of the vessel. In this method, the steaming is carried out for a desired period and then the tanks are opened up to cool and are then washed down with a hose first from the deck and then from the bottom of the tank. After this all the shelves, frame-work, plating and sides of the tank are scraped down by hand to get the bulk of the sediment and rust from the tank. The bottom sediment is then hauled out on deck. In some cases caustic soda is then sprinkled on the frames, shelves, gussets, etc., or this may be done previous to the first steaming, the steam dissolving the soda and tending to carry the deposit with it to the bottom of the tank.

The tanks are then ready to receive the liquid for soaking and the cleaning liquid is then forced into the tank. Usually kerosene is preferred, although a distillate or other similar mixture may be employed. It is the usual practice to fill one or more tanks well up in the expansion trunk and then allow it to soak for from six to twenty-four hours. After this the liquid is pumped out of the tank and the steam turned on through the steam smothering line for several hours after which the sides are washed down with water and the parts again scraped and scaled and the sediment removed from the bottom. This operation is repeated with a new batch of cleaning liquid and then all the packing is renewed about the hatch covers, expansion joints, ullage plates, valves, etc. This re-packing of the parts becomes necessary from the straining of the parts due to the unequal heating involved in the cleaning operation, and it is found that by this method of cleaning the liquid accumulates in the bottom of the tank so that the lower part of the tank is kept comparatively cool, while the upper part is heated and furthermore, the gathering of liquid in the bottom portion of the tank prevents this area from being cleaned when the hose is used against the tops and sides.

It is an object of my invention to provide a process of cleaning the interior of tanks of this character in which the interior of the tank is thoroughly cleaned at all points and in which unequal heating of the tank is entirely avoided.

It is also an object to dispense with the necessity of scraping and the hand work invoved in the old method of cleaning.

It is another object to simplify the labor and cheapen the cost of cleaning the interior of tanks of the character stated.

It is desired to clean the interior of the tank by force of streams of liquid directed against the sides under high pressure and in which the liquid thus used in cleaning is simultaneously removed from the tank together with the sediment obtained in the cleaning operation.

Referring to the drawing herewith, I have shown somewhat diagrammatically a cross section of the hull of a tanker showing the apparatus by means of which my process may be carried into execution.

In the drawing the hull of a ship is designated by the numeral 1, the cross section showing the two tanks, one on each side of the interior of the vessel, separated by a central partition 4. The bottom of the vessel is ordinarily somewhat flattened, as shown at 2, the deck being indicated at 3.

It is a common feature in the usual tanker to provide wing tanks on the upper outer portions of the main tanks, and such a tank is shown in the drawing on each of the main tank sections 27. These tanks have a bottom 8 and an inner side wall 7, the outer wall corresponding with that of the main tank. In carrying out my invention, the wing tanks are used to contain the cleaning liquid, although it is to be understood that this liquid may be contained in a separate container or tank on the deck or in an adjacent vessel. The liquid employed in the cleaning is placed in this tank and may be heated through a heating coil 26 connected by means of the pipe 25 to a source of supply of steam or other heating fluid. The cleaning fluid is circulated from the wing tank by means of a pump 9 having a suction line 10 directed into the wing tank, and an outlet line 11 through which the liquid from the pump may be directed into the pipe 12 and downwardly to the nozzles 15 through which the liquid is discharged in a solid stream against the sides of the tank. It will be noted that the two nozzles 15, one at each side of the main carrying line 13, are directed in opposite directions. This type of cleaning device is shown in my previous Patent No. 1,557,240, issued October 13, 1925, and the exact construction thereof is not a part of the present invention. The connecting T 14 is secured rigidly upon the pipe 13, the pipe 13 being rotated through a shaft 18 at the upper end thereof and the pipe 12, through which the fluid flows from the pipe 11, is held stationary. The lower end of the pipe 12 is formed with a stationary gear 17 thereon which is engaged by a gear 16 upon one of the nozzles. The rotation of the shaft 18 and the tube 13 leading therefrom rotates the T 14 and the nozzles and the engagement between the gear 16 and the stationary gear 17, while the tube 13 is rotated, will cause the nozzles to be rotated in planes parallel with the pipe 12. It is to be understood that the gears 16 and 17 are not of exactly the same size so that the courses of the streams issuing from the nozzles 15 will take a different path on each revolution which they make about the central shaft 13.

The shaft 18 is rotated by means of a gear 19 thereon connected with a gear 20 engaged therewith and said gear 20 may be rotated by any desired means, such as the crank 21, or through connection with some source of power such as an air engine or similar apparatus.

It will be noted that the cleaning apparatus is supported upon the upper end of the hatch way 5 but it is to be understood that it may be mounted in any desired manner, the object being to locate the nozzles 15 in such position within the tank that the streams of cleaning fluid may be directed under high pressure against the whole interior of the tank, it being found that in apparatus of this kind the whole inner side of the tank will be engaged by the streams of liquid during the rotation of the nozzles so that all sediment, scale and dirt will be removed.

Simultaneously with the cleaning of the interior of the tank, I remove the cleaning liquid at once from the bottom of said tank. This is done by means of a pump, the inlet port of which is connected with a pipe closely adjacent the bottom of the tank. This pump may be placed in any convenient position. I have shown the same as seated within the bottom of the tank adjacent the one being cleaned. This pump 23 has an inlet or suction line 24 directed through the wall between the two tanks and acting to withdraw the cleaning liquid together with the sediment and this liquid is pumped out through the line 22 to the wing tank 7, where the sediment will settle out therefrom and the same cleaning liquid used over again.

In carrying out this process, the interior of the tank may be washed first with hot water. The water, after being heated in the wing tank through the heating coils, or through any other suitable means, is pumped under heavy pressure against the interior of the tank, removing the sediment and the rust and washing the same to the bottom of the tank where it is at once removed. The removal of the cleaning liquid allows the streams of cleaning liquid which are directed against the bottom to have a full cleaning effect thereon in the same manner as it has against the side and top walls.

The cleaning liquid proper is usually kerosene or some similar distillate which is heated and directed against the sides of the tank and the pumping of the same against the wall with force removes the rust and sediment from all the corners and crevices between the plates and the frame-work and washes it down to the bottom where it is at once removed. This process may be continued until the interior is entirely free of foreign material. This may take from four to eight hours, depending upon the state of the interior of the tank before the cleaning is begun.

In carrying out my improved method, it is essential that the pressure employed be sufficient to erode or cut the scale and other sediment from the surface to be cleaned, and the initial pressure of the jets or streams as delivered into the tanks by the nozzles should not be substantially less than forty pounds to the square inch or even in those cases where the splashing reaction of the jets is desired, due to the presence of cross beams or channels in the tank structure, which it is desired to clean, the minimum pressure should not be less than 75 lbs. per sq. in., and preferably a pressure of one hundred to one hundred and fifty pounds per square inch, or even higher, is employed. Furthermore, the surfaces to be cleaned, and particularly the bottom of the tank, wherein the greater part of the sediment tends to collect, should be maintained substantially bare, that is, a large volume of liquid should not be allowed to collect thereon during the cleaning operation, in order that the high pressure jets may directly impinge against the sediment, rust, scale and like material to be eroded and to be removed, and accordingly, for this purpose, the suction pump employed for the removal of the liquid from the bottom of the tank should be positioned aft, as in any empty vessel the draught will be such that this aft end will be the low point of the vessel, and therefore the suction pump should be so positioned that it will be in the aft end or whatever other position is substantially the lowest point of the vessel so that the surfaces to be cleaned are substantially kept clear of a buffer layer of cleaning liquid which is being recirculated through the vessel to be cleaned.

My improved process not only enables me to effect the cleaning of cargo tanks at from 50% to 75% less cost than other processes now in use, but it accomplishes the cleaning of the ship's pipe lines, pumps and valves simultaneously with the cleaning operation, as I preferably include as part of my system the ship's pump and pipe lines, and it thereby becomes unnecessary to renew the packing in the pipe system or open the valves or remove the pump heads or pipe fittings as is customarily now the case when the cleaning of the ship is undertaken.

In order to prevent the cleaning fluid, particularly when kerosene is employed for this purpose, from being too rapidly volatilized, I cause a solid jet of the same to be propelled through the nozzles which deliver into the vessel being cleaned instead of effecting the introduction of the liquid in the form of an atomized spray.

When the cleaning operation is finished, it is preferred to remove the small residual body of liquid which may collect in the low point of the vessel when the operation of the apparatus is stopped by means of a vacuum pump, or manually, as desired.

This method of cleaning the interior of tanks is not only quicker in its operation and more economical to carry out than is the old process, but it is much less harmful to the interior of the tank. All of the sides of the tank are equally heated through the oil so that there is no unequal strain on the rivets. Also all portions of the interior of the tank are equally clean. All of the rust and scale can be thus removed so that no gas forming sediment can be left upon the walls of the tank. The bottom of the tank is cleaned equally as well as are the top and sides and a more perfect and thorough cleaning is obtained in this method than by the old, as is found in practice. After thus being cleaned, the tank may be used for the lighter distillates with practically no discoloration whatever to the liquid being carried. It also eliminates danger and discomfort to men who, under the old method, are compelled to enter the tanks to scrape and brush the surfaces, and eliminates exposure of these men to gas and the heat. The further advantages thereof will be obvious to those skilled in the art.

The ejector nozzles are positively driven through gearing instead of reliance being placed upon the reaction obtainable from the high pressure of the liquid circulating therethrough to revolve the same since, owing to the unevenness of the surface upon which the high pressure jets impinge due to obstructions on the inside of tankers such as iron cross-beams, there is a counter reaction transmitted back to the nozzles from the uneven surface of the tank and, due to the fact that they are arranged in pairs so as to counterbalance each other, they would if the reaction of the jets were the sole motive power cease to rotate entirely under certain conditions. One of the principal advantages of my improved system resides in the fact that no preliminary steaming whatsoever of the tanks to be cleaned is required either for the purpose of gas-freeing the same or for rendering the heavy oil residuum susceptible to removal by the high pressure impact jets. As a consequence the deterioration of tankers and other vessels due to the expansion and contraction strains under steaming with the consequent loosening of rivets and the acceleration of corrosion resulting from steaming operations is avoided while at the same time owing to the terrific direct erosion and melting action and secondary reflecting, splashing or rebounding action of the hot high pressure impact jets, it is possible to completely gas-free and otherwise clean every crevice and channel of a tank of a tanker or other vessel merely by mounting the apparatus in the geometrical center of a large tank and without necessitating the constant shifting of the apparatus itself. The economies accomplished, due to the virtual elimination of the labor element, as a result of the action of the nozzles,—a crew of some sixty men is often required under the old systems of hand cleaning—as well as the complete gas-freeing, without the necessity for resorting to steaming with its attendant direct and indirect expense, are startling.

Where light oil, such as gas oil or kerosene for example, is employed as the circulatory cleansing liquid, it will dissolve the otherwise virtually useless bottom oil sediments or residues that can be run through the cracking stills of a refinery, thus greatly reducing the cost of the cleaning, since the cleaning oil will be increased in bulk proportionate to the amount of residues dissolved therein.

Furtherfore, the residues, which are stripped or eroded as minute or small particles or droplets from the tank bottom and sides and the ship's pipe lines as well, will float upon or be carried off with the circulating liquid. As a consequence, neither the pump lines nor the pump will be clogged up during the pumping operation with the gobs or snake-like strings of residuum from the tank, so that the cleaning is accomplished continuously without any halts or shut downs being required to blow out the accumulated masses or gobs of residue from the hose, the pump lines or the pump itself, and in this respect my process differs materially from other pumping operations now resorted to for removing bottom residues from tanks and tankers.

I claim:

1. A process of cleaning interiors of tanks of cargo vessels and like nautical vessels, to remove oil residuum and scale therefrom, comprising heating water, directing the said water in streams with force, while under a high pressure, in excess of 100 lbs. per square inch, and sufficient to dislodge and disintegrate accumulated scale on the tank walls, through an orifice against the sides and bottom walls of such tanks, and simultaneously accomplishing the stripping of such tanks by utilizing the inherent drainage of such vessels, whereby liquid is directed to a low point of the tanks thereof, and removing the used water together with the dislodged oil residuum so accumulating at such low point at a rate to maintain the bottom walls free of water and in a condition to be cleaned by the same cleaning operation.

2. A process of cleaning the interiors of tanks of cargo vessels and like nautical vessels, comprising heating a solvent oil, directing the said solvent oil in streams with force through an orifice against the sides and bottom walls of said tanks and simultaneously accomplishing the stripping of said tanks, by utilizing the inherent drainage of such vessels, whereby liquid is directed to a low point of the tanks thereof, and removing the used solvent oil accumulating at such low point at a rate to maintain the bottom walls free of liquid and in condition to be cleaned by the same cleaning operation.

3. A process of cleaning interiors of tanks of cargo vessels and like nautical vessels, to remove oil residuum and scale therefrom, comprising heating water, directing the said water in streams with force, while under a high pressure sufficient to dislodge and disintegrate accumulated scale on the tank walls, through an orifice against the sides and bottom walls of such tanks, and simultaneously accomplishing the stripping of such tanks by utilizing the inherent drainage of such vessels, whereby liquid is directed to a low point of the tanks thereof, and removing the used water together with the dislodged oil residuum so accumulating at such low point at a rate to maintain the bottom walls free of water and in a condition to be cleaned by the same cleaning operation.

4. In the process of cleaning oil tanks of nautical vessels, to remove oil residuum therefrom, the steps which comprise delivering an impact jet of cleaning liquid through an orifice into the tank to be cleaned under a high initial pressure, and in excess of 75 lbs. per square inch, and during the delivery of such cleaning liquid maintaining the bottom of said tank substantially bare of cleaning liquid, in order to permit of direct impingement of the cleaning liquid against the residuum to be removed without the interposition of a buffer layer of liquid therebetween, by utilizing the inherent drainage of such vessel whereby liquid is directed to the low point of such tank and effecting the discharge of the liquid from an area adjacent such low point; and repeatedly changing by precise predetermined increments the position of such orifice in such a manner as to cause said jet to describe a plurality of different paths, of generally similar contour, on the interior tank surfaces whereby said jet will eventually impinge against substantially every portion of such tank surfaces.

5. In the process of cleaning oil tanks of nautical vessels to remove residual deposits and gases therefrom, the steps which comprise the repeated circulation of hot water through said tanks by establishing a main body of hot water heated to a sufficiently high temperature to supply all of the heat required to effect the softening and dislodging of residual deposits on the tank walls, withdrawing portions of such hot water from the main body and continually discharging the same against the sides and bottom walls of the tanks as high pressure splashing impact jets, accomplishing the stripping of the said tanks by utilizing the inherent drainage of such vessels, whereby said water is directed to a low point of the tanks thereof, and removing the introduced water accumulating at such low point at a rate sufficient to maintain the bottom walls of the tanks substantially bare of an interposed buffer layer of cleaning water and continually returning the water so withdrawn from the tanks to said main body of water for re-use in said cleaning operation, such treatment constituting substantially the sole heating and gas-freeing treatment applied to said tanks for accomplishing the gas-freeing thereof and for softening and dislodgment of the residual deposits therein.

6. A process of cleaning the interior of oil tanks of nautical vessels, comprising flushing the interior thereof with a jet of hot water, removing the used water and sediment, then directing a solid jet of hot kerosene with force against the bottom and other walls of said tanks while causing said jet of kerosene to describe a plurality of different paths of generally similar contour on the respective interior tank surfaces and to eventually impinge against substantially every portion of such interior tank surfaces and maintaining said bottom walls approximately free of liquid and sediment to permit direct contact of said jet of kerosene therewith by utilizing the inherent drainage of such vessels, whereby liquid is directed to a low point of the tanks thereof, and removing the accumulating liquid from an area adjacent such low point.

7. In the process of cleaning a tank of a nautical vessel having inherent drainage, whereby liquid is directed to a low point of such tank, to remove residual deposits therefrom, the steps which comprise the repeated circulation of hot liquid through said tank by establishing a main body of hot liquid and continuously discharging portions of the liquid into the tank as splashing impact jets under a pressure of not less than 75 lbs. per square inch and withdrawing portions of the liquid from the tank from an area adjacent such low point of the tank at a rate sufficient to substantially maintain the tank in a stripped condition and thereby avoid the interposition of a substantial buffer layer of liquid in the bottom of the tank and to thereby insure the direct impingement of the jets on the accumulations of dislodged deposits continually returning the liquid so withdrawn from the tank to said main body of liquid for re-use in such cleaning operation and without substantially changing the zone of delivery of such jets into said tank, causing said jets to travel in predetermined but constantly changing paths so as to describe a plurality of different paths, of generally similar contour, on the respective interior surfaces of said tank and to eventually impinge against every portion of such tank surfaces.

8. The process of cleaning the interior of tanks of cargo vessels and like nautical vessels having inherent drainage, whereby liquid is directed to a low point of the tanks thereof, comprising heating a cleaning liquid, directing said liquid in streams with force from moving nozzles against the sides and bottom walls of said tanks without substantially changing the zone of delivery of such streams into such tanks while mechanically changing the path of projection of the streams from said nozzles by predetermined increments sufficient to insure the direct impingement of such streams successively against all of the different areas of the interior surfaces of said tank; and simultaneously removing the used liquid accumulating at such low point of such tanks at a rate to maintain the bottom walls free of liquid and in condition to be cleaned by the same operation.

9. The process of cleaning the interior of tanks of cargo vessels and like nautical vessels having inherent drainage, whereby liquid is directed to a low point of the tanks thereof, comprising heating a cleaning liquid, directing said liquid in streams under a pressure of at least 100 lbs. per square inch from moving nozzles against the sides and bottom walls of said tanks without substantially changing the zone of delivery of such streams into such tanks while mechanically changing the path of projection of the streams from said nozzles by predetermined increments sufficient to insure the direct impingement of such streams successively against all of the different areas of the interior surfaces of said tank; and simultaneously removing the used liquid accumulating at such low point of such tanks at a rate to maintain the bottom walls free of liquid and in condition to be cleaned by the same operation.

ARTHUR B. BUTTERWORTH.